Patented Nov. 15, 1932

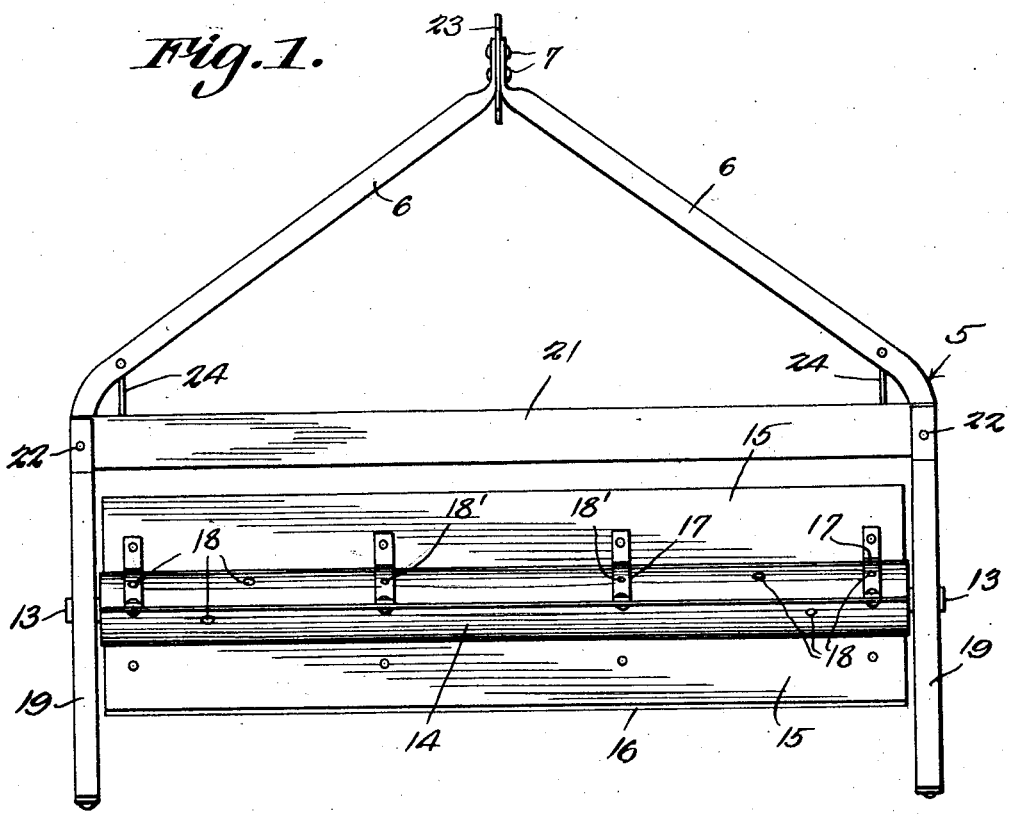

1,887,818

UNITED STATES PATENT OFFICE

WILLIAM J. MICHALKA, OF CAMERON, TEXAS

STALK CUTTER

Application filed December 15, 1930. Serial No. 502,558.

This invention relates to agricultural machines, and more particularly to machines known as stalk cutters, the primary object of the invention being to provide a machine of this character which will be exceptionally cheap to manufacture, and one wherein the weight of the machine will act to force the chopping blades through the stalks being chopped by the machine.

Another object of the invention is to provide a machine of this character wherein the rotary cutting blades thereof will operate by contact with the ground surface over which the machine is moving.

A still further object of the invention is the provision of skids so constructed that they will support the weight of the machine, when the machine is being moved, from place to place, thereby relieving the blades of undue wear caused by the cutting edges thereof contacting with the ground surface.

Another important object of the invention is to construct a stalk cutter in such a way that the blades may be readily removed, should it be desired to use the device as a roller.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a stalk cutter constructed in accordance with the invention.

Figure 2 is a sectional view through the cutter.

Figure 3 is a longitudinal sectional view taken on line 3—3 of Figure 2.

Referring to the drawing in detail, the cotton chopper comprises a frame embodying side bars 5 that have their forward ends extended towards each other, as at 6, where they are connected by means of the bolts 7.

Hangers 8 are secured to the bars 5, the hangers being U shaped and formed with laterally extended ends 9 to receive the bolts 10, for securing the hangers in position. Bearing blocks 11 are fitted in the hangers, and are secured in position by means of the bolts 12, the bearing blocks being formed with bearing openings to receive the shafts 13 that extend from the blade supporting member 14, the shafts 13 being shown as extended into the member 14, where they are secured by means of bolts 18.

Blades 15 extend throughout the length of the blade supporting member 14, and are shown as extending therefrom, the edges of the blades being beveled as at 16, providing cutting surfaces. Curved arms 17 are secured to the member 14 by means of the bolts 18' that are shown as passing through the member 14 and arms 17, the blades being arranged in predetermined spaced relation with each other. Thus it will be seen that due to the construction shown and described, the blades may be readily and easily disconnected from the member 14, and the device used for rolling the ground surface.

The reference character 19 designates skids that are secured to the bars 5, the forward ends of the skids being curved as at 20, to cause the skids to ride over irregularities.

When the cutter is being moved from place to place, the frame may be inverted, so that the weight of the device will be supported on the skids 19, relieving the blades of unnecessary wear when moving the device.

The reference character 21 designates a cross bar that has its ends connected to the bars 5, by means of bolts 22, the bar 21 acting to hold the bars 5 in proper spaced relation with each other at all times.

A hook 23 is provided at the front end of the device, and affords means whereby a chain, cable, or other towing mechanism, may be hooked to the device.

Mounted in advance of the blades 15, are rods 24 that extend rearwardly and have downwardly extended portions 25 that engage the stalks being chopped, to guide them towards the center of the machine, to be cut by the blades 15.

In the use of the device, the machine is moved over the ground surface, the blades acting as a support for the machine, the weight of the machine forcing the blades through the stalks or material being cut by the device.

I claim:

In a stalk cutter, a frame comprising side bars, U-shaped hangers depending from the side bars, bearing blocks fitted within the U-shaped hangers and filling the space between the hangers and side bars, said bearing blocks having bearing openings, a cylindrical blade supporting member mounted between the bearing blocks, shafts extending into the ends of the cylindrical blade supporting member, bolts extending through the cylindrical blade supporting member and disposed at right angles with respect to each other, said bolts extending through the shafts securing the shafts against movement within the cylindrical blade supporting member, and said blades extending appreciable distances beyond the cylindrical blade supporting member to chop stalks over which the device is moved.

In testimony that I clam the foregoing as my own, I have hereto affixed my signature.

WILLIAM J. MICHALKA.